United States Patent
Hayashi et al.

(10) Patent No.: US 7,574,044 B2
(45) Date of Patent: Aug. 11, 2009

(54) IMAGE PROCESSING APPARATUS, IMAGE PROCESSING METHOD AND IMAGE PROCESSING PROGRAM

(75) Inventors: Hiroshi Hayashi, Kanagawa (JP); Toshiyuki Yamada, Kanagawa (JP); Yoshitake Matsubara, Kanagawa (JP); Kiyotaka Tsuchibuchi, Kanagawa (JP); Noriko Arai, Kanagawa (JP); Junichi Shimizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 681 days.

(21) Appl. No.: 11/264,257

(22) Filed: Nov. 2, 2005

(65) Prior Publication Data

US 2006/0104512 A1    May 18, 2006

(30) Foreign Application Priority Data

Nov. 5, 2004  (JP)  ............................ 2004-322013
Oct. 13, 2005  (JP)  ............................ 2005-298488

(51) Int. Cl.
*G06K 9/34* (2006.01)
*G06K 9/00* (2006.01)
*G06K 15/02* (2006.01)
*G09G 5/00* (2006.01)

(52) U.S. Cl. ...................... 382/176; 382/164; 358/1.11; 345/636

(58) Field of Classification Search ................ 382/160, 382/164, 173, 176, 177, 218, 232, 305, 312; 707/5, 100; 345/604, 636; 358/1.11, 515
See application file for complete search history.

(56) References Cited

U.S. PATENT DOCUMENTS

| 5,465,304 | A | * | 11/1995 | Cullen et al. ................ 382/176 |
|---|---|---|---|---|
| 5,745,600 | A | * | 4/1998 | Chen et al. ................... 382/218 |
| 6,327,382 | B1 | * | 12/2001 | Kaneda et al. .............. 382/164 |
| 6,377,704 | B1 | * | 4/2002 | Cooperman .................. 382/176 |
| 6,397,213 | B1 | * | 5/2002 | Cullen et al. .................... 707/5 |
| 6,519,362 | B1 | * | 2/2003 | Cusmariu .................... 382/176 |
| 6,535,652 | B2 | * | 3/2003 | Nakatsuka .................. 382/305 |
| 7,085,420 | B2 | * | 8/2006 | Mehrotra .................... 382/232 |
| 2004/0177064 | A1 | * | 9/2004 | Satoh ............................ 707/3 |
| 2004/0243601 | A1 | * | 12/2004 | Toshima ..................... 707/100 |

FOREIGN PATENT DOCUMENTS

| JP | 07-021344 | 1/1995 |
|---|---|---|
| JP | 2001-344245 | 12/2001 |

* cited by examiner

*Primary Examiner*—Kanji Patel
(74) *Attorney, Agent, or Firm*—Oliff & Berridge, PLC

(57) ABSTRACT

An image processing apparatus has an extracting unit, a dividing unit and a text searching unit. The extracting unit extracts a text part from an image. The dividing unit classifies text in the text part based on color information of the text. The text searching unit searches the text based on the color information.

14 Claims, 5 Drawing Sheets

IMAGE PROCESSING APPARATUS, IMAGE PROCESSING METHOD AND IMAGE PROCESSING PROGRAM

BACKGROUND

1. Technical Field

The present invention relates to an image processing apparatus, an image processing method, and an image processing program, wherein texts are searched by use of images.

2. Related Art

One mode of a text search is a case where an electronic document obtained by reading an original by means of a scanner is subjected to OCR (Optical Character Reader) processing and a text search is performed over an object area, which has been recognized as a text part by processing, by means of specifying (inputting) a keyword. In relation to such a text search based on a keyword, when a global search, or the like, is performed over, e.g., an object text part containing a huge volume of texts, a time which elapses from commencement of a text search until the end of the search (hereinafter called a search time) becomes extremely long.

A known technique is to utilize an index as feature information about an image in order to perform a text search at high speed.

However, at the time of a text search, when the feature information about an image, such as the above-described index, is specified, operation for specifying purpose becomes very troublesome. Consequently, shortening a search time encounters difficulty in appropriately and simply specifying conditions for a text search.

SUMMARY

According to an aspect of the present invention, an image processing apparatus includes an extracting unit that extracts a text part from an image, a dividing unit that divides the text part extracted by the extracting unit according to a color of text, a search condition specifying unit that enables to specify a keyword and the color of text as a search condition of text, and a text searching unit that performs a text search using the specified keyword for a text part corresponding to the specified color of text, when the keyword and the color of text are specified by the search condition specifying unit, the text part being divided by the dividing unit according to the color of text.

According to another aspect of the present invention, an image processing method includes an extracting step of extracting a text part from an image, a dividing step of dividing the text part extracted by the extracting step according to a color of text, and a text searching step of performing a text search using a specified keyword for a text part corresponding to a specified color of text among the groups when the keyword and the color of text are specified as a search condition of text, the text part being divided by the dividing step according to the color of text According to an aspect of the present invention, an image processing apparatus has an extracting unit, a dividing unit, and a text searching unit. The extracting unit extracts a text part from an image. The dividing unit classifies text in the text part based on color information of the text. The text searching unit searches the text based on the color information.

DETAILED DESCRIPTION

A specific embodiment of the present invention will be described in detail hereinbelow by reference to the drawings.

Figure 1:
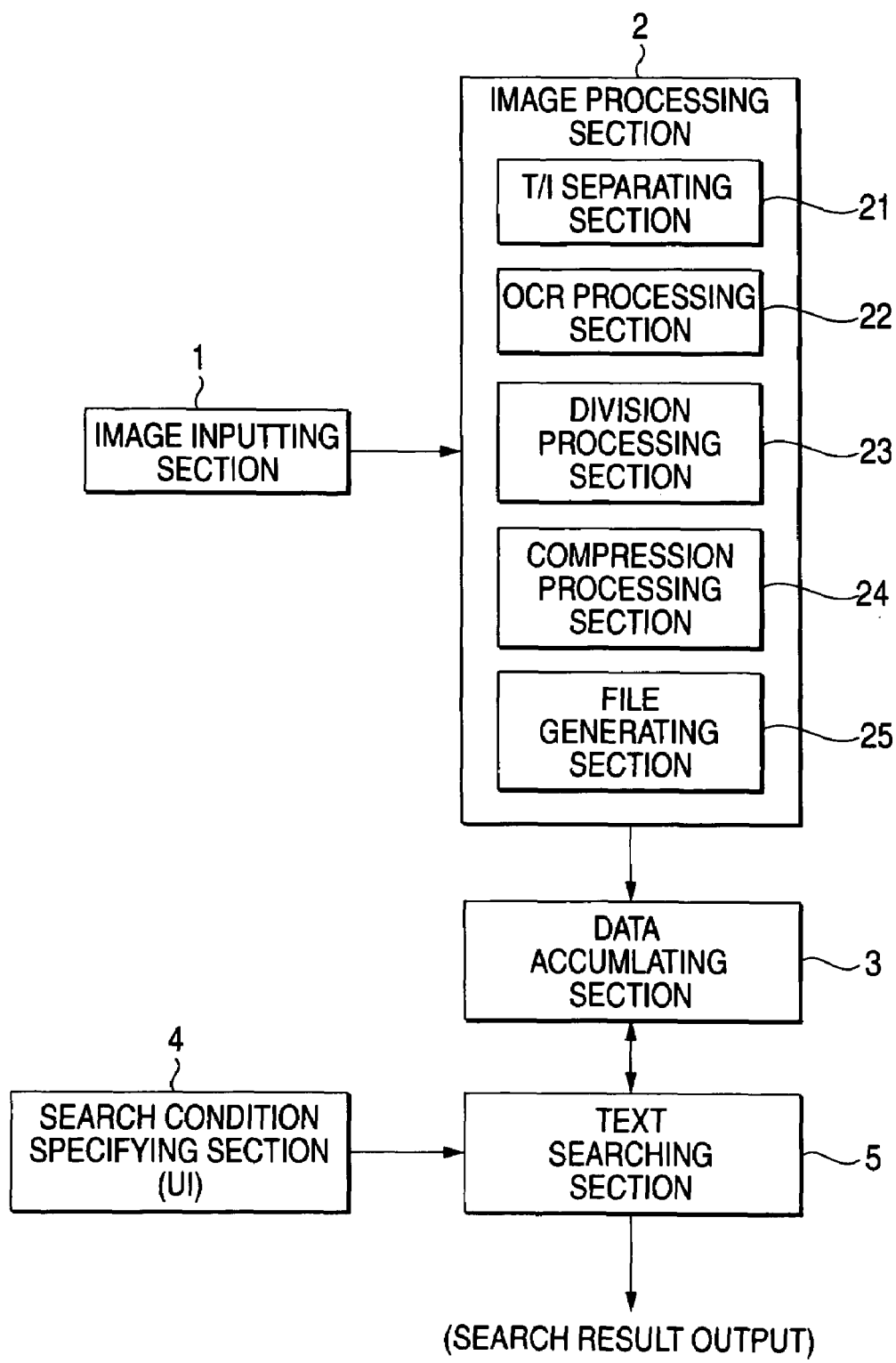
FIG. 1 is a block diagram showing an example configuration of an image processing apparatus according to an embodiment of the present invention.

FIG. 1 is a block diagram showing an example configuration of an image processing apparatus according to an embodiment of the present invention. An illustrated image processing apparatus roughly includes an image inputting section 1, an image processing section 2, a data accumulating section 3, a search condition specifying section 4, and a text searching section 5.

The image inputting section 1 is for inputting an image. For instance, the image inputting section 1 can be configured by use of an image reading apparatus, such as a scanner, for optically reading an image of an original. An image input by means of the image inputting section 1 may be any of a color image, a black-and-white image, and an image containing both color and black-and-white images. The color image may include two colors having black and one color other than black (e.g., red), three colors including one other color in addition to the two colors, or full colors of four colors or more.

When the image inputting section 1 is configured by the image reading apparatus, the data format of an image input from the image inputting section becomes a bit map format. However, when the image inputting section 1 is configured from a device which inputs image data received by a transceiving section having a network communication function, a card reader which reads image data from a compact storage medium such as a memory card, or means for reading image data from a large-capacity storage section, such as a hard disk drive or the like, provided internally or externally, the data format is not limited to a bitmap format but may be another data format. The present embodiment describes, as an example, a case where the image inputting section 1 is constituted of a color image reading apparatus including a color scanner. Particularly, when the image inputting section 1 is configured by the image reading apparatus, a text part printed on a paper medium is converted into an electronic format, and the thus-converted text part can be utilized for a text search.

The image processing section 2 subjects the image data input from the image inputting section 1 to predetermined image processing. By way of an example of a specific image processing function section, the image processing section 2 includes a T/I separating section 21, an OCR processing section 22, a division processing section 23, a compression processing section 24, and a file generating section 25.

The T/I separating section 21 separates the image input from the image inputting section 1 into a text part (a text) and a picture part (an image). The OCR processing section 22 subjects to OCR processing the text part of the image input from the image inputting section 1.

The division processing section 23 groups the text part of the image converted into text data by means of OCR processing according to the color of a text, to thus divide the text part. The color information of the text can be acquired from the attribute information of individual texts constituting the text part included in the image input from the image inputting section (an image reading apparatus) 1. Division processing involving grouping operation is carried out on a per-text basis in relation to the text part that has been converted into text data as mentioned previously. In connection with the color classifications of the texts used for grouping, provided that the color of the text is expressed in a YCbCr color space, plural threshold values are set for a Y value, a Cb value, and a Cr value for color classification. On the basis of these threshold values, the YCbCr color space is classified into plural color domains, for example, a black color domain, a red color domain, a blue color domain, a yellow color domain, and a green color domain.

The T/I separating section 21 divides the image input from the image inputting section 1 into a text part and a picture part, and the compression processing section 24 compresses these parts individually. The file generation section 25 generates single files from the text part and the picture part, which have been compressed by the compression processing section 24, in accordance with a predetermined file format.

The data accumulating section 3 accumulates the data that have been subjected to image processing in the image processing section 2. This data accumulating section 3 is formed from, e.g., a hard disk drive.

The search condition specifying section 4 is for specifying conditions of a text search, and is formed from, e.g., a user interface (UI) having a display section and an input section. This search condition specifying section 4 can specify the color of a text in addition to being able to specify a keyword (word) as conditions for the text search. The color of the text, which can be specified as a search condition, corresponds to the color classifications of the text made by the division processing section 23. For instance, as mentioned previously, provided that the YCbCr color space is classified into the black color domain, the red color domain, the blue color domain, the yellow color domain, and the green color domain, the search condition specifying section 4 can specify any one or more colors (a maximum of four colors in this embodiment) from among the five colors, that is, black, red, blue, yellow, and green. When the color of the text is not specified as a condition of the text search, all colors, i.e., five colors, become objects of a search.

The text searching section 5 is for performing text search processing according to the conditions of the text search specified by the search condition specifying section 4. A file including data, which are to become an object of a search, is specified by means of additionally specifying a filename through use of a user interface or indicating search execution with an image of the data contained in the file being displayed on the display section of the user interface. The result of the search performed by the text searching section 5 is displayed on the display section of the user interface.

Next, processing procedures employed when a text search is carried out through use of the image processing apparatus of the embodiment of the present invention will be described. Processing pertaining to a text search is roughly divided into first processing and second processing.

Figure 2:
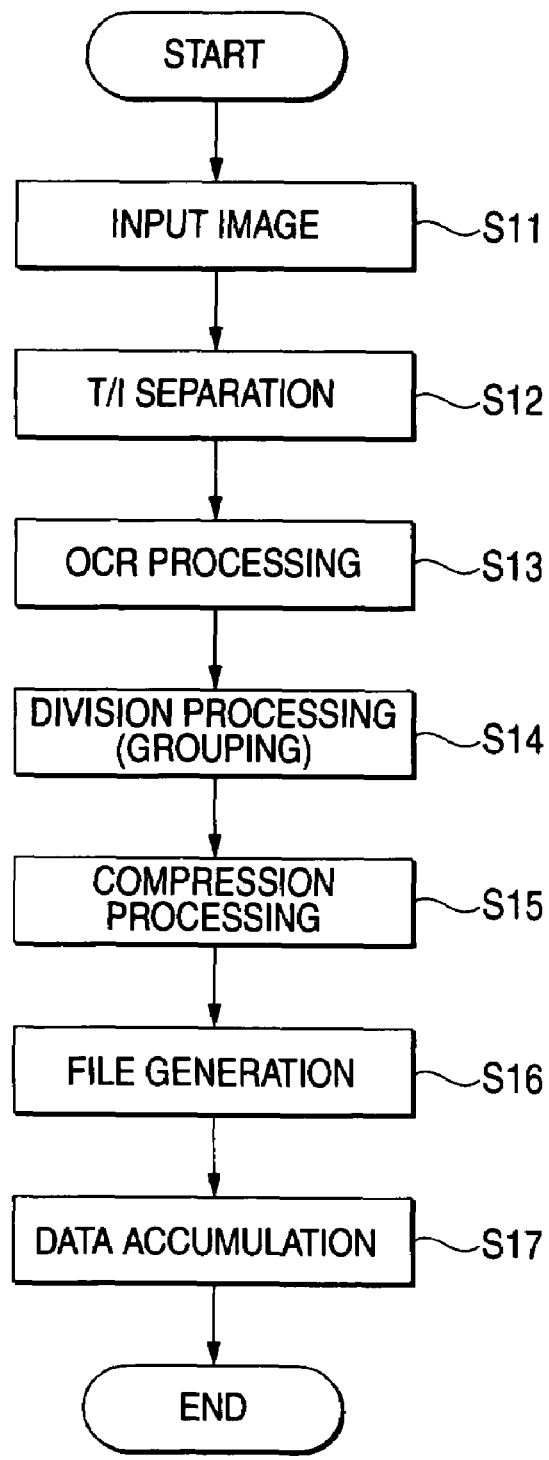
FIG. 2 is a flowchart (part 1) showing processing procedures employed when a text search is performed through use of the image processing apparatus of the embodiment of the present invention.

First, during first processing shown in FIG. 2, an image for one page (one sheet of original) or plural pages (plural sheets of original) is first input from the image inputting section 1 (step S11). Subsequent processing may be sequentially performed on a per-page basis or in units including plural pages.

Next, the image input from the image inputting section 1 is separated by the T/I separating section 22 into a text part and a picture part (step S12).

Figure 3:
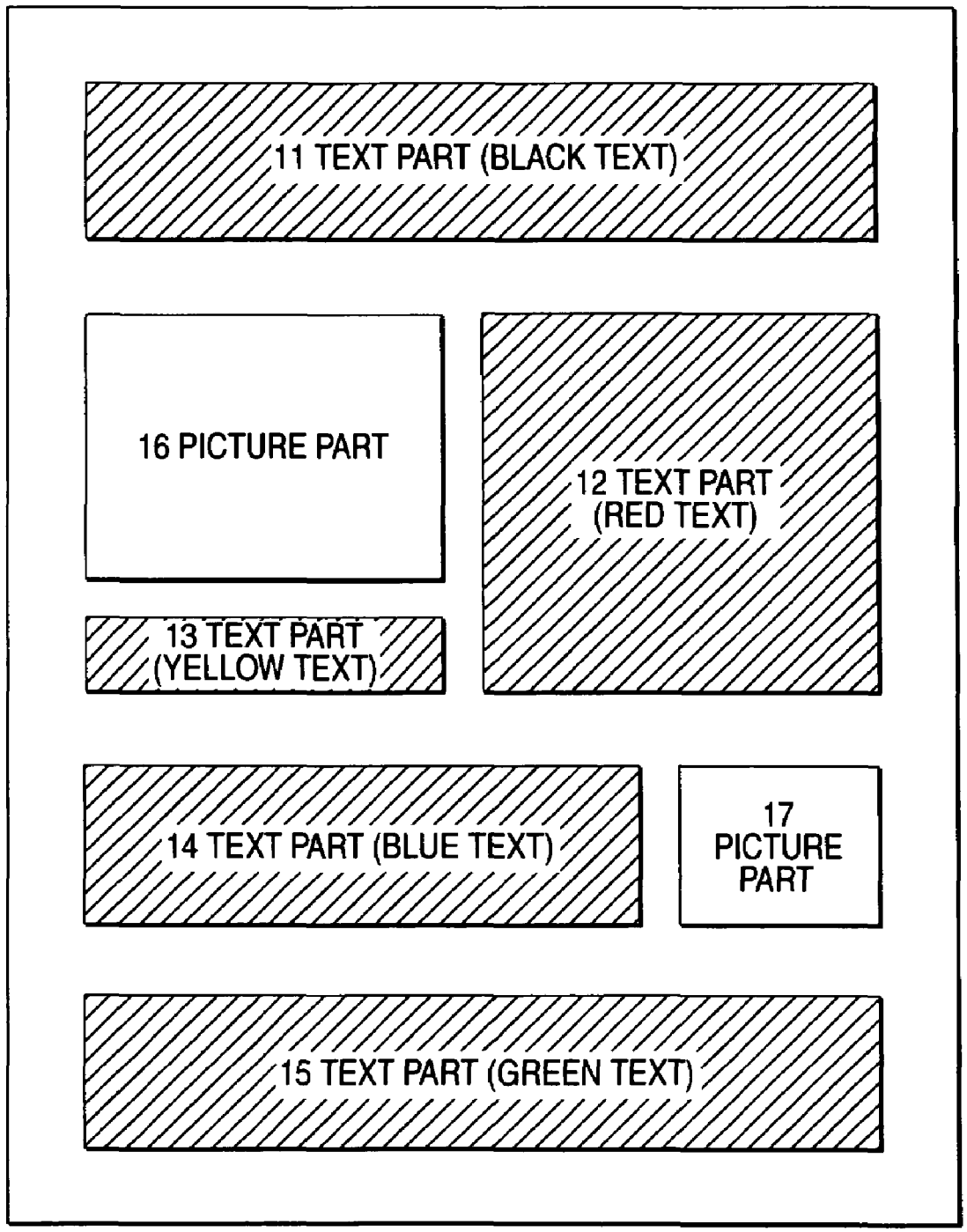
FIG. 3 is a view showing an example where an input image is separated into a text part and a picture part.

FIG. 3 shows an example of one input image being divided into a text part and a picture part. In FIG. 3, five text parts 11 to 15 and two picture parts 16, 17 are present in one input image (for one page). Here, for convenience of explanation, the entire text part 11 is assumed to be formed from black characters, the entire text part 12 is assumed to be formed from red characters, the entire text part 13 from yellow characters, the entire text part 14 from blue characters, and the entire text part 15 from green characters. However, a single text part can be formed from characters of plural colors.

Subsequently, the text part of the image is subjected to OCR processing in the OCR processing section 22, whereby the respective text parts 11 to 15 are converted into text data (step S13). Thereby, individual characters constituting the respective text parts 11 to 15 are converted into character codes on a per-character basis. Specifically, the T/I separating section 21 and the OCR processing section 22 constitute extraction means for extracting the text parts 11 to 15 from the image input from the image input section 1. Thus, the extraction means is constituted of the T/I separating section 21 and the OCR processing section 22, whereby the text part can be extracted as text data even when the image data input from the image input section 1 are bitmap data (scan data).

Subsequently, the text parts 11 to 15, which have already been subjected to OCR processing, are grouped and divided for each color of text by the division processing section 23 (step S14). Here, as shown in, e.g., FIG. 4, five groups such as a black-based group G1, a red-based group G2, a blue-based group G3, a yellow-based group G4, and a green-based group G5 are assumed to have already been prepared as groups for color classification. As mentioned previously, as a result of plural threshold values being set in the YCbCr color space, the respective groups G1 to G5 are classified as partial domains in the YCbCr color space.

Figure 4:
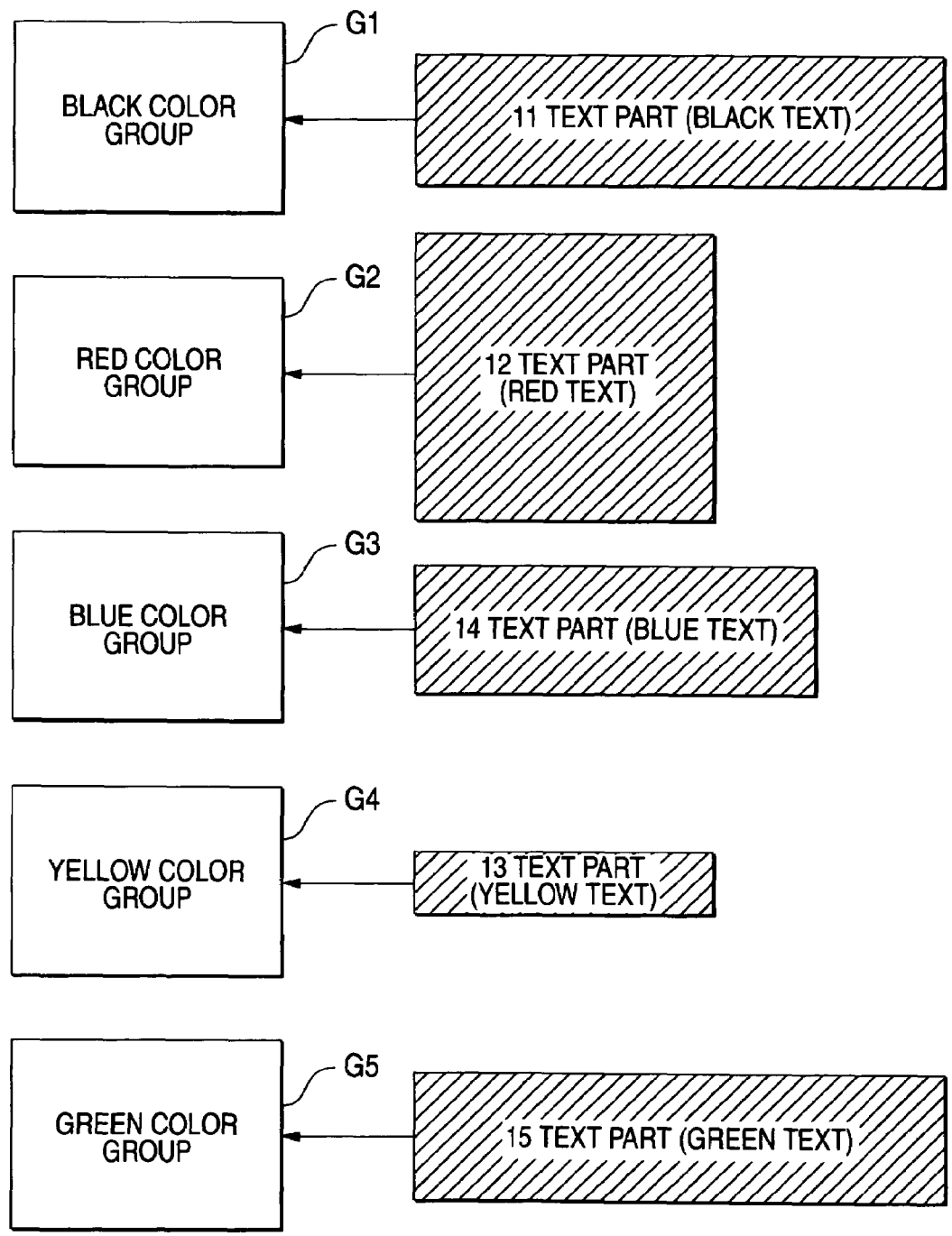
FIG. 4 is a view showing example processing performed when the text part is divided by means of grouping.

The division processing section 23 samples color information about a text constituting each of the text parts 11 to 15 on a per-text basis, converts the color information from RGB to YCbCr through color conversion, and determines which domain (which color group) in the YCbCr color space contains the color. For instance, as shown in FIG. 4, when the five text parts 11 to 15 are subjected to division processing, the entire text (the black text) constituting the text part 11 is classified into the black-based group G1, the entire text (the red text) constituting the text part 12 is classified into the red-based group G2, the entire text (the yellow text) constituting the text part 13 is classified into the yellow-based group G4, the entire text (blue text) constituting the text part 14 is classified into the blue-based group G3, and the entire text (green text) constituting the text part 15 is classified into the green-based group G5.

When texts constituting each text part are classified into groups according to the color of text, coordinate data showing the position of a text of interest in the input image have been assigned to a character code in each group in advance. The reason for assigning each of the texts to coordinate data in a one-to-one correspondence in advance is to enable reconstruction of an original image according to coordinate data even after the texts have been classified into the respective groups. When texts of plural colors are present in one text part separated by the T/I separating section, the texts constituting one text part are classified into the plural groups in a dispersed manner.

Subsequently, the text part and the picture part are compressed by the compression processing section 24 (step S15)

The text part has already been grouped on a per-text-color basis through the preceding division processing. Accordingly, after text parts belonging to the respective groups have been binarized on a per-group (the color of a text) basis, the text parts are subjected to compression processing in a G4 compression scheme adopted for, e.g., a facsimile. Separately from the text part, the picture part is subjected to compression processing by means of a well-known method.

The text part and the picture part, both of which belong to the respective group and which have been compressed in the manner mentioned above, are grouped into a single file by the file generating section 25, to thus produce a file (step S16). For example, an MRC (Mixed Raster Content) format can be adopted as a format for generating a file. Next, the file generated by the file generating section 25 is accumulated (stored) in the data accumulating section 3 with a file name which is specified by the user or is automatically generated (step S17)

Figure 5:
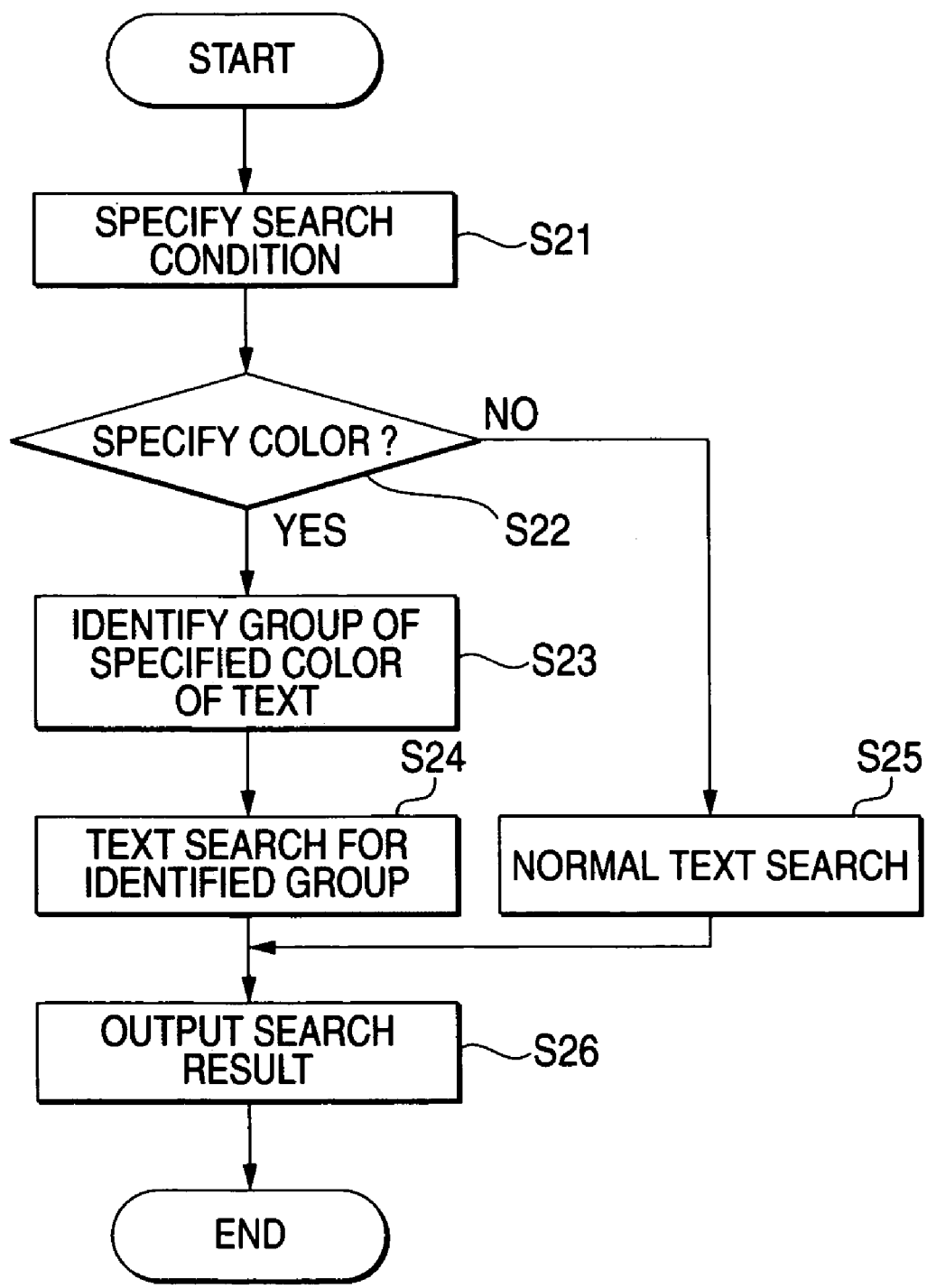
FIG. 5 is a flowchart (part 2) showing processing procedures employed when the text search is performed through use of the image processing apparatus of the embodiment of the present invention.

In second processing shown in FIG. 5, search conditions used for causing the search condition specifying section 4 to effect a text search are specified (step S21). Specifying the search condition is performed as a result of the user performing a predetermined input operation by way of the search condition specifying section 4. At that time, specifying at least one keyword is indispensable as a condition for a text search. In addition to specification of a text search, the color of a text can be specified according to the user's desire. It may be the case that only one color is specified as the color of the text, or plural colors may be specified simultaneously.

Next, a determination is made, as one condition for a text search, as to whether or not the color of a text has been specified in step S21 (step S22). When the color of the text has been specified, the text searching section 5 specifies a group matching the specified text color, and a text search using the specified keyword is performed in relation to solely a text part belonging to this group (steps S23, S24). For instance, when the color of the text has been specified by a black color as conditions for a text search, a text search using a specified keyword is performed in relation to only a text part belonging to the group G1 into which the black text is classified (in other words, the text parts belonging to the other groups G2 to G5 are excluded from the object of a text search). Moreover, when the color of a text is specified by two colors as conditions for a text search, namely, a black color and a blue color, a text search using a specified keyword is carried out in relation to only the text part belonging to the group G1 into which black texts are classified and a text part belonging to the group G3 into which blue texts are classified (in other words, the text parts belonging to the other groups G2, G4, and G5 are excluded from the objects of a text search).

In contrast, when the color of the text has not been specified in step S21, the text searching section 5 performs a text search using a specified keyword in relation to all the groups G1 to G5 (step S25). Subsequently, the result of the text search performed by the text searching section 5 is output (displayed) on, e.g., a display section of the user interface (step S26).

As mentioned above, according to the image processing apparatus and the image processing method using the apparatus, both of which pertain to the embodiment of the present invention, the text parts are extracted from the images input by way of the image input section 1, and then grouped and divided according to the color of a text. At the time of an actual text search, the color of the text is specified along with the keyword under the search conditions, thereby performing a text search in relation to only the text parts belonging to the group matching the color of the text. In this case, the color of the text is visually easy to discriminate and handle for all users. Hence, as a result of the color of this text being adopted as one of the conditions for a text search, the conditions for the text search can be specified appropriately and simply. When the color of the text is specified as a condition for a text search, the target range of a text search can be narrowed solely to a text part belonging to the group matching the specified color of the text. Hence, the search time can be shortened significantly.

In a case where a text search is carried out in relation to, e.g., text parts of images of some of hundreds of pages, as a specific example, when the text parts of the images are formed from plural titles and sentences relevant to the respective titles, when the titles are formed from blue texts, when the majority of the sentences relevant to the title are formed from black texts, and when particularly important portions of the sentences are formed from red texts, the target range of a text search can be narrowed solely to the text part (the blue text) constituting the title, by means of specifying the color of the text by a blue color as a condition for a text search. Consequently, even when the text parts of images of some hundreds of images are subjected to a text search, a desired search result can be acquired within an extremely short period of time.

Respective steps of the image processing method based on the flowchart can be implemented by means of program processing. Consequently, the present invention can provide, as an image processing program to be executed by a computer, respective steps based on the flowchart, especially, an extraction step (S12, S13) for extracting a text part from an image, a division step (S14) for grouping and dividing the text parts extracted in the extraction step according to the color of a text, and a text search step (S23, S24) where, when a keyword and the color of a text are specified as conditions for a text search (when Yes is taken in step S22), the text parts belonging to a group matching the specified color of a text, among the groups divided in the division step on a per-text-color basis, are subjected to a text search using a specified keyword. Moreover, the image processing program can be provided while being recorded on a computer-readable recording medium, such as a CD-ROM or a DVD-ROM.

Under the image processing apparatus and the image processing method, both pertaining to the present invention, when text are extracted parts from images, the thus-extracted text parts are grouped and divided on a per-text-color basis, and a keyword and the color of a text are specified as conditions for a text part, a text search using a specified keyword is performed in relation to text parts belonging to a group matching the specified color of the text. In contrast with a case where the size of a text, a pitch between texts, and the type of a text are specified, specification of conditions for a text search become easier, and narrowing a target range of a text search to a group including the specified color of a text becomes possible.

According to the present invention, conditions for a text search can be specified appropriately and simply when a text search is carried out, and a search time can be shortened significantly.

The entire disclosure of Japanese Patent Applications No. 2004-322013 filed on Nov. 5, 2004 and No. 2005-298488 filed on Oct. 13, 2005 including specification, claims, drawings and abstract are incorporated herein by reference in its entirety.

What is claimed is:

1. An image processing apparatus comprising:
   an extracting unit that extracts a text part from an image;
   a dividing unit that divides the text part extracted by the extracting unit according to colors of text contained in the extracted text part, wherein the colors of text are expressed in a certain color space, and threshold values are set in components of the certain color space in advance;

a search condition specifying unit configured to specify a keyword and a color of text as a search condition of text; and a text searching unit that searches the divided text part using the specified keyword and the specified color of text.

2. The image processing apparatus according to claim 1, further comprising:

an image inputting unit that inputs the image, wherein the image inputting unit includes:

an image reading unit that reads an image in a manuscript.

3. The image processing apparatus according to claim 2, wherein the extracting unit includes:

a separating unit that separates the image inputted by the image inputting unit into a text part and a picture part; and an OCR (Optical Character Reader) processing unit that performs an OCR process for the text part in the image.

4. The image processing apparatus according to claim 1, further comprising:

a compression unit that binarizes segment parts obtained by dividing the text part by the dividing unit and compresses the binarized segment parts.

5. An image processing apparatus comprising:

an extracting unit that extracts a text part from an image;

a dividing unit that classifies text in the text part based on color information of the text, wherein the color information used for classifying is expressed in a certain color space, and threshold values are set in components of the certain color space in advance;

a search condition specifying unit configured to specify a search condition including color information; and a text searching unit that searches the text based on the color information of the search condition.

6. The image processing apparatus according to claim 5, wherein the text is classified based on the color information by each character, a word, or a sentence.

7. The image processing apparatus according to claim 5, wherein the text is searched based on the color information and a keyword.

8. The image processing apparatus according to claim 5, wherein the color information is acquired from attribute information of individual texts constituting the text part.

9. The image processing apparatus according to claim 5, further comprising:

a compression unit compresses the text part extracted by the extracting unit and other parts individually.

10. The image processing apparatus according to claim 5, wherein one text has a plurality of colors.

11. The image processing apparatus according to claim 5, wherein coordinate data are assigned to each text and the image is reconstructed based on the coordinate data after the text have been classified.

12. The image processing apparatus according to claim 5, further comprising:

a compression unit that binarizes segment parts obtained by classifying the text part by the dividing unit and compresses the binarized segment parts.

13. An image processing method comprising:

inputting an image with an image reading apparatus;

using a computer to perform the steps of:

an extracting step of extracting a text part from the image;

a dividing step of dividing the text part extracted by the extracting step according to colors of text contained in the extracted text part, wherein the colors of text are expressed in a certain color space, and threshold values are set in components of the certain color space in advance; and a text searching step of performing a text search using a specified keyword for a text part corresponding to a specified color of text, when the keyword and the color of text are specified as a search condition of text.

14. A computer readable storage medium, the storage medium storing a program of instructions executable by the computer to perform a function for image processing, the function comprising the steps of:

Inputting an image with an image reading apparatus;

extracting a text part from the image;

dividing the text part extracted by the extracting step according to colors of text contained in the extracted text part, wherein the colors of text are expressed in a certain color space, and threshold values are set in components of the certain color space in advance; and performing a text search using a specified keyword for a text part corresponding to a specified color of text, when the keyword and the color of text are specified as a search condition of text.

* * * * *